UNITED STATES PATENT OFFICE.

JOHN DIMELOW AND ROBERT M. PEADRO, OF ROUND ROCK, TEXAS.

MANUFACTURE OF HYDRAULIC CEMENT AND LIME.

SPECIFICATION forming part of Letters Patent No. 237,500, dated February 8, 1881.

Application filed November 15, 1880. (No specimens.)

*To all whom it may concern:*

Be it known that we, JOHN DIMELOW and ROBERT M. PEADRO, of Round Rock, in the county of Williamson and State of Texas, have invented a new and useful Improvement in the Manufacture of Hydraulic Cements and Lime, of which the following is a specification.

In all limestone regions the stratum or belt of stone is made up of three portions, viz: the upper portion of crude hydraulic limestone, which, by proper treatment in burning, falls or slakes in water readily; a middle portion, which, being properly burned, will fall in water, but not slake; and a lower portion, which, after remaining in water for some length of time will fall apart, but will not slake or form milk of lime, as will the top portion. This decomposed or rotten limestone is always thrown aside as being useless. We find by experiment that this decomposed limestone will, after being properly treated, yield a strong hydraulic cement or lime of high quality, that can be employed in the ordinary manner of using cements, or be cast into water, as with ordinary lime.

Our invention consists in air or steam slaking the decomposed or rotton limestone after being properly burned or calcined.

As the first step in the process, the decomposed limestone is well calcined or burned at any required heat, according to its state of decomposition or hardness. For this purpose the process described in the Letters Patent granted to John Dimelow, June 25, 1878, for manufacture of hydraulic cement, can be used to advantage. The upper stratum first named will readily slake after burning; but the middle and lower strata require further treatment, and after burning the material is conveyed to a tightly-closed building, shed, or receptacle through which a current of steam or air is passed, which acts to air or steam slake the stone. The material may then be sifted, or first ground and then sifted. This gives a strong hydraulic lime or cement that is adapted for all purposes for which lime and cement are used by being water-slaked and used as common lime is used; or by mixture with other materials it can be used for the manufacture of artificial stone, fire-proof brick, &c.

By mixing with the lime or cement mineral and other substances, such as argillite, silicate of alumina, strong joint clays, rich alluvial deposits of rivers, and specially refuse or waste brick, clinker, and other refuse materials from brick and pottery manufacture, a material valuable for fire-proof surfaces, bricks, and stones is produced, adapted for building, paving, roofing, and hydraulic purposes, which stones or bricks require no burning, and increase by age in hardness, quality, and value.

Having thus fully described our invention, we claim as new and desire to secure by Letters Patent—

1. The herein-described process for the manufacture of hydraulic cement or lime from rotten or decomposed limestone, which consists in first burning the stone, then subjecting it to currents of air or steam in a tightly-closed receptacle, and finally sifting the material, with or without grinding, all substantially as described.

2. The material for manufacture of fire-proof brick, stone, and for similar uses, consisting of slaked decomposed limestone, and burned or unburned clay, alluvial deposits, and similar materials, as specified.

JOHN DIMELOW.
ROBERT MANDEVILLE PEADRO.

Witnesses:
W. S. GILLIAM,
JAMES H. ROBERTSON.